(12) United States Patent
Hanson et al.

(10) Patent No.: US 10,176,532 B1
(45) Date of Patent: *Jan. 8, 2019

(54) INSURANCE CLAIM CAPITATION AND PREDICTIVE PAYMENT MODELING

(71) Applicant: Allstate Insurance Company, Northbrook, IL (US)

(72) Inventors: Randall Hanson, Grayslake, IL (US); Robert H. Johnson, Hoffman Estates, IL (US); Kurt M. Stricker, Northfield, IL (US); Clint J. Marlow, Barrington, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,958

(22) Filed: Apr. 24, 2017

Related U.S. Application Data

(63) Continuation of application No. 14/032,751, filed on Sep. 20, 2013, now Pat. No. 9,665,912.

(60) Provisional application No. 61/703,556, filed on Sep. 20, 2012.

(51) Int. Cl.
*G06Q 40/00* (2012.01)
*G06Q 40/08* (2012.01)
*G06Q 10/00* (2012.01)

(52) U.S. Cl.
CPC ............. *G06Q 40/08* (2013.01); *G06Q 10/20* (2013.01)

(58) Field of Classification Search
CPC ............................... G06Q 40/00; G06Q 40/08
See application file for complete search history.

(56) References Cited

U.S. PATENT DOCUMENTS

| | | |
|---|---|---|
| 8,595,034 B2 | 11/2013 | Bauer et al. |
| 2002/0002475 A1 | 1/2002 | Freedman et al. |
| 2005/0251427 A1 | 11/2005 | Dorai et al. |
| 2008/0255887 A1 | 10/2008 | Gruter |
| 2009/0265193 A1 | 10/2009 | Collins et al. |
| 2011/0106569 A1 | 5/2011 | Price |
| 2013/0013348 A1 | 1/2013 | Ling et al. |
| 2013/0304519 A1 | 11/2013 | Altieri et al. |
| 2014/0052478 A1 | 2/2014 | Weinstock et al. |

OTHER PUBLICATIONS

Jul. 10, 2015—Final Office Action—U.S. Appl. No. 14/032,744.
Jul. 13, 2015—U.S. Final Office Action—U.S. Appl. No. 14/032,751.
Aug. 22, 2016—U.S. Final Office Action—U.S. Appl. No. 14/032,744.

(Continued)

*Primary Examiner* — Lalita M Hamilton
(74) *Attorney, Agent, or Firm* — Banner & Witcoff, Ltd.

(57) ABSTRACT

A claim-based capitation model is proposed for handling vehicle repair insurance claims. Rather than determining a detailed estimate of the expected actual cost of repair, the estimate may be determined using a simpler model. For example, the insurance company and a repair facility may agree to following a predictive payment model in which the insurance company pays a fixed predicted capitated amount of money for each repair claim, regardless of the amount of repair work that will be needed. Alternatively, the insurance company may pre-pay a fixed capitated amount for a predicted number of future insurance claims.

20 Claims, 5 Drawing Sheets

(56) References Cited

OTHER PUBLICATIONS

Aug. 22, 2016—U.S. Final Office Action—U.S. Appl. No. 14/032,751.
Jan. 17, 2017—U.S. Notice of Allowance—U.S. Appl. No. 14/032,744.
Jan. 23, 2017—U.S. Notice of Allowance—U.S. Appl. No. 14/032,751.
Oct. 6, 2017—U.S. Non-Final Office Action—U.S. Appl. No. 15/489,071.

INSURANCE CLAIM CAPITATION AND PREDICTIVE PAYMENT MODELING

CROSS-REFERENCE TO RELATED APPLICATIONS

The present application is a continuation application and claims priority to U.S. Provisional Patent Application Ser. No. 61/703,556, filed Sep. 20, 2012 and U.S. patent application Ser. No. 14/032,751, filed Sep. 20, 2013, both entitled "Insurance Claim Capitation and Predictive Payment Modeling," both of which are hereby incorporated by reference in their entirety.

BACKGROUND

Automotive insurance claims are typically handled as follows. An insured makes a claim, the vehicle is inspected, and it is determined whether the vehicle is repairable or a total loss. If the vehicle is repairable, either an insurance adjuster or a repair facility determines an estimated cost for repairing the vehicle, based on the damage sustained to the vehicle. Thus, depending upon the vehicle and the type of damage, the estimated cost for various claims may take on a wide range of values.

Unfortunately, the estimation process itself is time-consuming, expensive, and often inaccurate. Estimation of repair value typically is performed by someone highly trained in the particulars of vehicle repair, and given the high work load and time involved in estimation, these persons are relatively expensive to maintain. And, because the estimation is just that—an estimation—the estimate is often later adjusted after the repair is completed to reflect actual repair costs. This can be inefficient for both the insurer and the repair facility and can sometimes result in lengthy negotiations between the parties. This, itself, can also be time-consuming and expensive, and can induce friction in the relationship between the insurance company and the repair facility.

SUMMARY

A claim-based capitation model is proposed for handling vehicle repair insurance claims. Rather than determining a detailed estimate of the expected actual cost of repair, the estimate may be determined using a simpler model. For example, the insurance company and a repair facility may agree to following a predictive payment model in which the insurance company pays a fixed predicted amount of money for each repair claim, regardless of the amount of repair work that will be needed. By the law of large numbers, it may be expected that an appropriately-determined fixed amount may, in the long term, result in a fair payment for both parties. Moreover, by potentially eliminating the detailed cost estimate and the post-repair negotiations, such a model may have the effect of reducing overall costs to both parties. For instance, repair shops may need fewer qualified estimation and negotiation resources, and insurance companies may also need fewer oversight and negotiation resources.

In a variation of the above model, the payment amount may not be entirely fixed across all vehicle claims, however the payment amount may be based on a pricing process that may be much simpler than the traditional estimation process. The pricing process may not even be based on an actual inspection of the vehicle. Rather, the amount to be paid to a repair shop for a given claim may be determined (e.g., predicted) based on a predictive and/or heuristic model. For instance, the amount to be paid may be determined based at least in part on one or more loss attributes of the claim, where each loss attribute may itself be associated with a particular fixed amount of money. Such loss attributes may include, for example, make, model, and/or year of the vehicle; type of damage or event (e.g., front-end collision, rear bumper damage, etc.), origin of manufacture of the vehicle (e.g., domestic, European, Asian, etc.); place of occurrence of the event; date of occurrence of the event; point of impact to the vehicle; volume and/or frequency of the particular claim type; and/or insurance coverage of the insured. These are merely examples, and so additional and/or alternative loss attributes may be used. As another example, the payment amount may be established by first classifying a claim into a range of payments that are applicable based on conditions to be assessed by the repair facility and validated by the insurance company. For example, a claim of front end damage may be classified in a range of $X to $Y, where the actual amount in that range ultimately depends upon whether the radiator must be replaced.

According to further aspects, the determined payment (e.g., the fixed payment or the loss-attribute-determined payment) may be paid to the repair facility up front. For example, the determined payment for a given claim may be paid to the repair facility before the repair has begun, before the vehicle has been received by the repair facility, or at any time during the claim. In further aspects, the payment may be provided even before the claim has been made by the insured. This may occur in a bulk process, for instance, where a repair facility is pre-paid for X number of repair claims per time period (e.g., per month, per quarter, or per year). If the repair shop is able to be paid earlier in the claims process, then the repair shop may be able to benefit from this such as by having the ability to invest the money in the business at an earlier stage. This may benefit both the repair facility and the insurance company in the long run, as it may allow the repair facility to make better business decisions, follow up with long-term planning with greater financial stability, and generally result in a potentially more cost-efficient repair business. Other potential benefits to the repair facility by receiving forecasted demand and prepayment for at least some types of repairs may ability to manage staff hiring and/or training, improved capacity to manage the parts supply chain, and/or improved capacity to manage parts costs.

These features are merely examples, and these and other features and details will be discussed below in the Detailed Description section of this paper. It is also noted that, while vehicle insurance claims are discussed in the various examples herein, the capitation models discussed herein may also be applied to other types of insurance claims, such as but not limited to homeowner insurance claims, renter's insurance claims, boat insurance claims, aircraft insurance claims, and personal property insurance claims in general.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
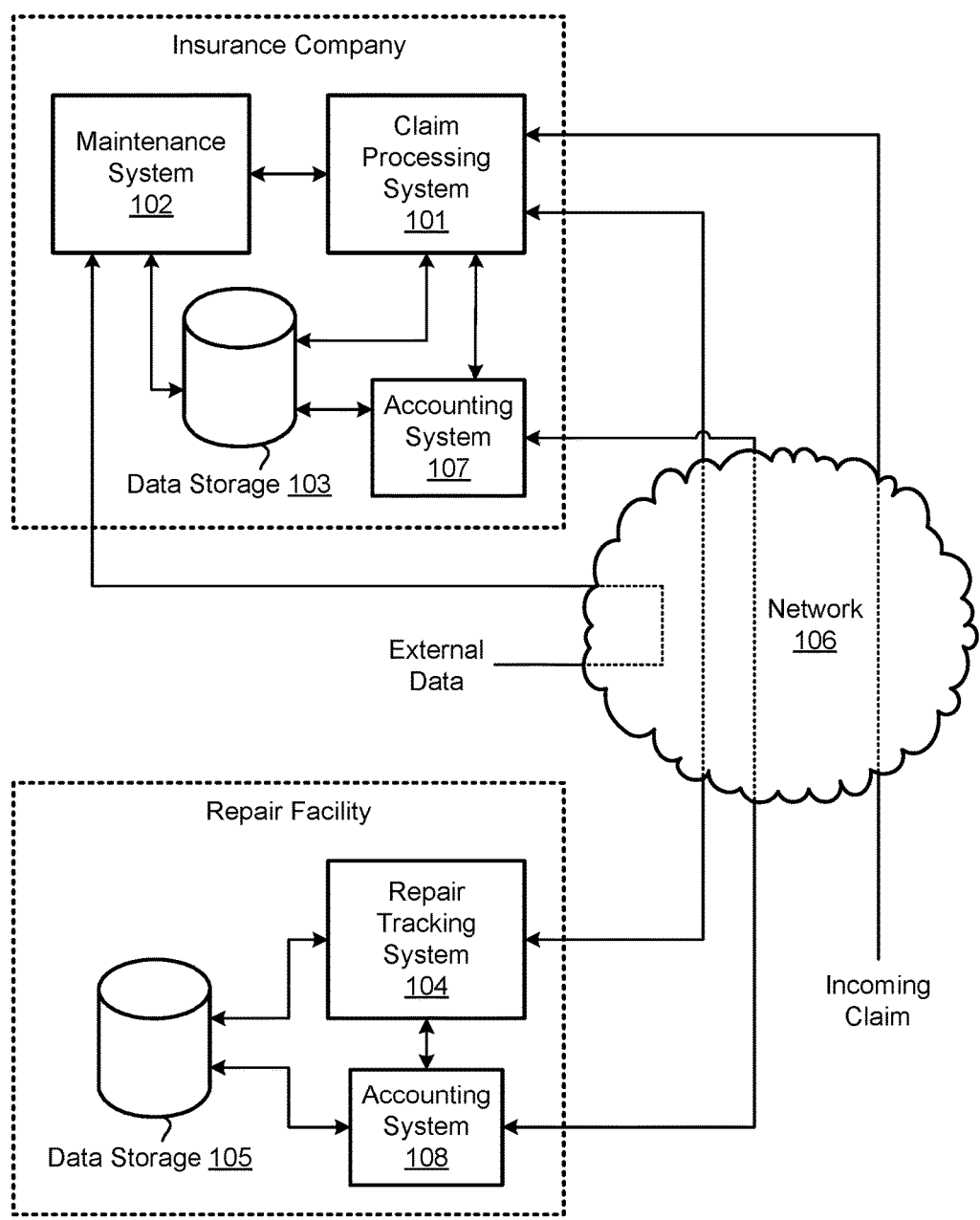
FIG. 1 is a block diagram of an example insurance claim environment that may be used in accordance with aspects as described herein.

FIG. 1 is a block diagram of an example insurance claim environment that may be used in accordance with aspects as described herein. The environment in this example includes an insurance company and one or more repair facilities. While only a single repair facility is shown in FIG. 1, it will be understood that there may be multiple different repair facilities in the environment, and each may be configured such as in the manner of the shown repair facility. Each repair facility may be, for example, an automobile repair garage that is dedicated for that purpose or that is included as part of a larger business such as a car dealer, a tire dealer, a gas station, a store, or the like.

The insurance company may have or otherwise control one or more computing and data storage resources for performing various functions related to insurance claims processing. In this example, the insurance company may have or otherwise control at least a claim processing system 101, a maintenance system 102, a data storage system 103, and an accounting system 107. It will be understood that the insurance company is likely to have other types of systems as well. The repair facility may have or otherwise control a repair tracking system 104, a data storage system 105, and an accounting system 108. Any of the systems of the insurance company and the repair facility may communicate with each other by sending information (e.g., electronically and/or physically) back and forth via a network 106.

The various systems 101, 102, 104, 107, and 108 may include or otherwise be embodied as one or more computing devices, such as one or more servers, personal computers, tablet computer, and the like, and/or one or more humans performing various tasks. Moreover, while each of the elements 101-108 are shown in FIG. 1 as separate elements, these elements may be physically and/or logically combined in any combination or subcombination, and/or further physically and/or logically sub-divided. For example, a single computing device may act as both the maintenance system 102 and the claim processing system 101, and/or as portions of one or both. The term "computing device" is broadly used herein to include both a single device (e.g., a single server) as well as multiple devices that work together (e.g., a plurality of servers and/or personal computers).

Claim processing system 101 may be responsible for processing incoming claims (e.g., in the form of data), and for making a determination as to how to process those claims. Information that may be used by claim processing system 101 may include the incoming claim information, information retrieved from data storage 103, information received from maintenance system 102, and/or information received from repair tracking system 104.

Maintenance system 102 may be responsible for maintaining the information (e.g., data) stored by data storage 103, including updating the information as needed. Maintenance system 102 may maintain the information stored by data storage 103 on the basis of received external data, data stored in data storage 103, and/or information received from claim processing system 101.

Network 106 may be any one or more networks, and may include one or more network types. Non-limiting examples of networks from which network 106 may be comprised may include the Internet, an intranet, a local area network, a wide-area network, a wired network (e.g., a landline telephone network, and Ethernet network, etc.), a wireless network (e.g., an IEEE 802.11 compliant network, a BLUETOOTH network, a cellular network, etc.), and an optical network. Network 106 may additionally or alternatively include one or more non-electronic networks for transferring information in physical form, such as a mail courier (e.g., the U.S. Postal Service, UPS, Federal Express, etc.).

Repair tracking system 104 may be responsible for keeping track of expected, current, and/or completed repairs performed by the repair facility. Information that may be tracked may include, for instance, information about the claim with which the repair is associated, the date and/or timeframe of the repair, the amount paid (or to be paid) by the insurance company for the repair, the estimated cost for the repair, the actual cost incurred for performing the repair, information about the vehicle customer, information about the vehicle, and/or any other information as desired. Such information may be stored in data storage 105.

Data storage 103 and 105 may be physically separate from the other elements 101, 102, 104, 107, and/or 108. For instance, data storage 103 and/or 105 may be embodied as racks of tape storage drives and/or hard drives. Alternatively, one or more of data storage 103 and/or 105 may be partially or fully integrated with one or more of the other elements 101, 102, 104, 107, and/or 108. For instance, data storage 103 and/or 105 may be embodied as hard drives, memory, and/or other computer-readable storage media that are at least partially part of one or more of the computing devices of any of elements 101, 102, 104, 107, and/or 108. Moreover, data storage 103 and data storage 105 may each include one or more computer-readable data storage devices, which may in turn include one or more computer-readable storage media. In addition, each of data storage 103 and data storage 105 may include or be interfaced by a database system that can be queried to update and/or retrieve data to/from data storage 103 and/or 105.

The accounting systems 107 and 108 may each be responsible for maintaining an accounting of payments made by the insurance company versus payments owed to the repair facility. The accounting systems 107 and 108 may be separate systems and/or they may be part of claim processing system 101 and/or repair tracking system 104. Moreover, the accounting system(s) 107 and/or 108 may be maintained by a third party if desired, such as by a bank or other financial institution.

Figure 2:
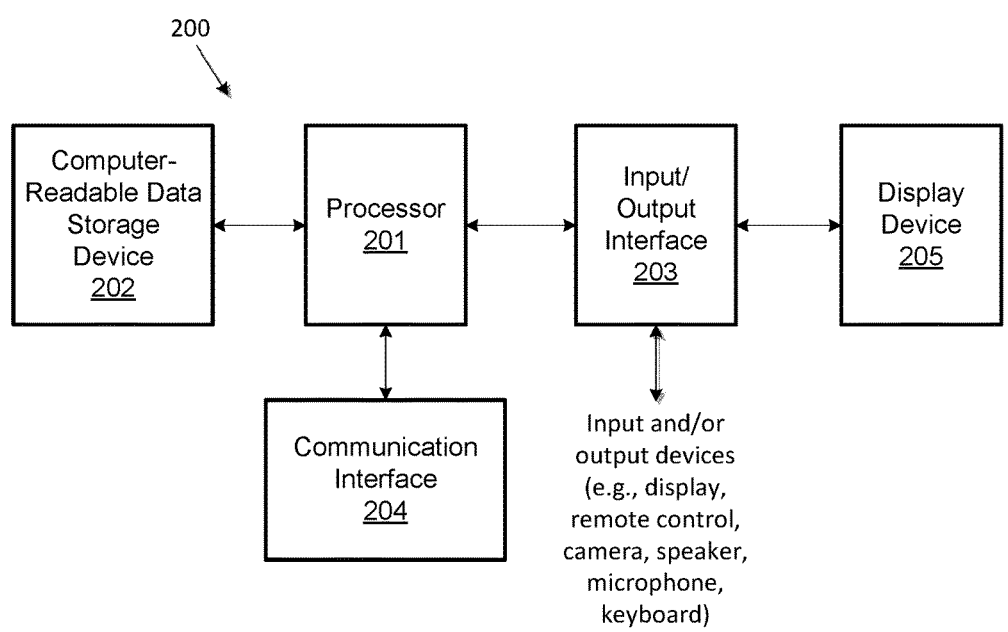
FIG. 2 is a block diagram of an example computing device that may be used to embody or otherwise implement any of the elements and functions discussed herein.

FIG. 2 illustrates an example of general hardware and/or software elements that can be used to partially or fully embody any of the various devices and functions discussed herein, such as any of those elements discussed herein with regard to FIG. 1. A computing device 200 (also often referred to as a computer) may include one or more processors 201, which may execute instructions of a computer program to perform any of the features described herein. The instructions may be stored in any type of tangible and/or non-transitory computer-readable data storage device 202 (which may include one or more computer-readable storage media, such as a memory or hard drive) to configure the operation of the processor 201. For example, instructions may be stored in a read-only memory (ROM), a random access memory (RAM), a removable media such as a Universal Serial Bus (USB) drive, compact disk (CD) or digital versatile disk (DVD), a floppy disk drive, an attached (or internal) hard drive, and/or any other desired data storage medium. The computing device 200 may include or be coupled to one or more output devices, such as a display device 205 (e.g., an external television, or a computer monitor), and may include one or more output device controllers, such as a video processor. The display device 205 may be physically separate from the computing device 200, or it may be integrated with the remainder of the computing device 200. There may also be one or more user input devices, such as a remote control, camera, keyboard, mouse, touch screen, microphone, etc. The computing device 200 may also include a communication interface 204, which may include one or more input and/or output circuits (e.g., in the form of a network card) to communicate with an external device or network (e.g., network 106). The communication interface 204 may include one or more wired interfaces, wireless interfaces, or a combination of the two.

Figure 3:
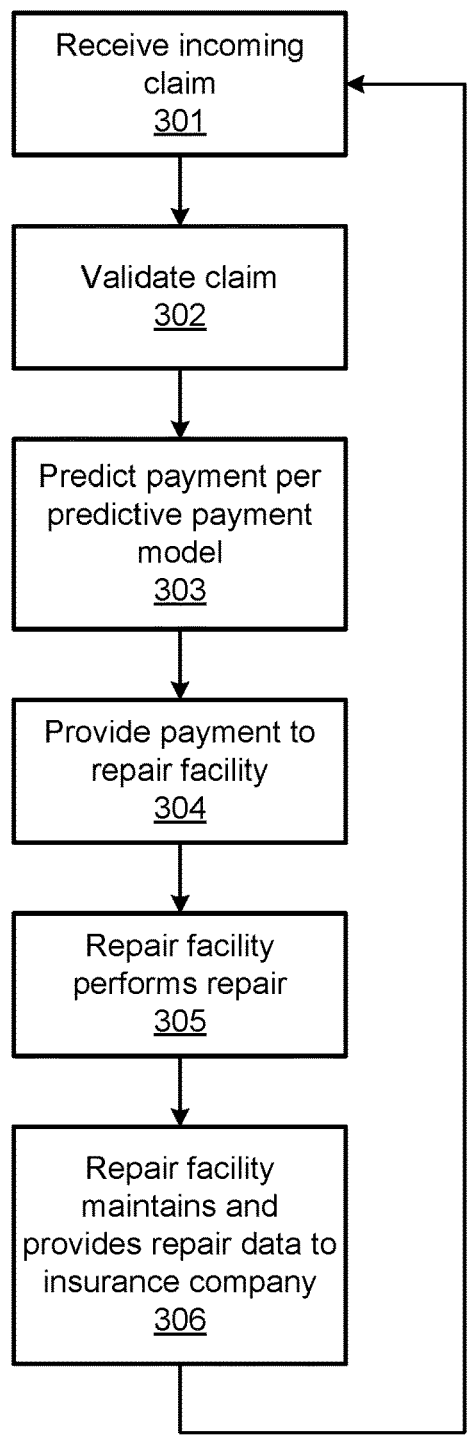
FIG. 3 is a flow chart of an example process that may be performed in accordance with one or more aspects as described herein.

FIG. 3 is a flow chart of an example process in accordance with one or more aspects as described herein. The various steps in the flow chart may be performed by one or more devices and/or humans, such as any of the elements of FIG. 1. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 301, the insurance company may receive an incoming new or revised claim. This may occur by, for instance, receiving and/or generating data representing characteristics of the claim, such as a description of the claim, an identification of the property (e.g., vehicle) affected by the claim, an identification of the insured, and identification of the type and/or extent of damage to the property, and identification of the timeframe (e.g., time, date, etc.) at which the damage occurred and/or when the claim is made, and/or any other information as desired. The data may be generated by and/or provided to, for instance, claim processing system 101.

At step 302, the claim may be validated, such as by physical inspection of the property (e.g., vehicle) to confirm the claimed damage, the existence of the property, and/or other issues that may be associated with a claim. Validating a claim may additionally or alternatively include, for instance, receiving one or more of the following inputs from the insured customer, an agent or another representative of the insurance company, and/or the repair facility: images of damage, descriptions of damage guided by a form or system, or free-form descriptions of damage. Any of those inputs may be analyzed by a system (such as claim processing system 101), such as according to a predictive payment model, to validate the claim, classify the nature of the claim or damage or repair needed, and/or establish a preliminary or final payment amount or range.

Validation may also involve determining whether the property can reasonably and/or cost-effectively be repaired (e.g., whether the property is repairable), or whether the property is considered "totaled" and no repair is to be made under the insurance contract. If it is determined that the property is repairable, then the process may move to step 303. Step 302 may be performed prior to sending the property to the repair facility (and by a party other than the repair facility such as an insurance adjuster), or it may be performed by the repair facility itself during, for instance, step 305.

At step 303, the payment amount to be made to the repair facility for the claim may be determined by, for instance, claim processing system 101, in accordance with a predetermined model. As previously discussed, the determination may be of a fixed amount defined by the model that does not vary from claim to claim (or at least from automotive repair claim to automotive repair claim). Thus, for example, a claim for a side-view mirror replacement may result in the same determined payment amount as a claim for a bumper replacement and re-painting and as a claim for body work performed on a vehicle. The determined payment amount may thus already be predetermined at the time that step 303 is performed, and data representing the predetermined payment amount may be stored in a data storage device, such as data storage 103 and/or as part of claim processing system 101.

Alternatively, the payment amount may be determined according to a particular model, referred to herein by way of example as a predictive payment model. The predictive payment model may be predetermined and/or dynamic, and may be stored as data and/or computer-executable instructions in a computer-readable storage medium such as data storage 103, and may be executed or otherwise implemented by one or more computers such as claim processing system 101.

The predictive payment model may include a payment schedule, in which the determined payment amount may vary depending at least upon the particular characteristics of the claim. In this case, the payment amount may be determined based at least on information (e.g., the payment schedule) stored in data storage 103 and/or information provided by maintenance system 102. For instance, the payment schedule stored in data storage 103 may associate each of a plurality of predetermined loss attributes with an effect on the determined cost. In this case, determination of the payment amount may include determining which of the loss attributes apply to the present claim. For example, if two of the predetermined loss attributes are (1) European car and (2) American car, and the claim is for damage to an American car, then the loss attribute "American car" may apply to that claim.

One or more of the loss attributes may be associated in data storage 103 (e.g., via a database) with a particular cost, and so the final determined payment amount may be based at least on a sum of those particular costs for the appropriate loss attributes of a claim. One or more of the loss attributes may additionally or alternatively be associated in data storage 103 with a particular multiplier, and so the final determined payment amount may additionally or alternatively be based at least on one or more costs being multiplied by one of the multipliers.

For example, assume that at least the following predetermined attributes are stored in data storage 103 and associated with the following costs and/or multipliers, as shown below in the example payment schedule of Table 1.

TABLE 1

Example Payment Schedule

| Loss Attribute | Associated Cost | Associated Multiplier |
| --- | --- | --- |
| European car | | M1 |
| American car | | M2 |
| side view mirror | C1 | |
| front bumper | C2 | |
| frontal collision | | M4 |
| ... | ... | ... |

If the claim is for an American car that needs a new front bumper and a side view mirror, then in this simplified example, the payment amount P for the claim may be based at least on the following calculation: M2*(C1+C2). Of course, the payment amount may depend upon other factors and other loss attributes. Moreover, the particular calculation is only an example, and loss attributes may affect the determined payment in other ways. Moreover, the multipliers do not need to necessarily affect all associated costs, and so the stored data of data storage 103 may further associate each multiplier with a list or class of loss attributes to be multiplied with. In general, one may consider each loss attribute to be associated with at least one value that may contribute to the final determined payment amount, and one may envision many possible ways in which the loss attribute values may be combined to determine the payment amount.

At step 304, the determined payment amount is actually paid to the repair shop. Payment may be performed physically (e.g., via physical currency) and/or electronically (e.g., via transfer to a bank account, and/or via recording the payment amount to an account of the repair shop). It is note that payment does not actually need to occur between steps 303 and 305, and may occur at any time. In this example, the payment may be made at any time once the payment amount for the claim has been determined. For example, payment may be made periodically for a batch of claims, rather than on a claim-by-claim basis.

At step 305, the repair shop may perform the needed repair on the vehicle and/or other property covered by the claim. If the vehicle has not already been transported to the repair shop at an earlier step (such as during validation at step 302), then the vehicle may be transported to the repair shop. Once the repair is complete, the vehicle may be returned to the vehicle owner.

At step 306, the repair shop may maintain repair data, such as via repair tracking system 104 (and which may be stored by data storage 105). The repair data may include any information about the claim and/or about the repair made. For instance, the repair data may include information about the claim with which the repair is associated, the date and/or timeframe of the repair, the amount paid (or to be paid) by the insurance company for the repair, the estimated cost for the repair, the actual cost incurred for performing the repair, information about the vehicle customer, information about the vehicle, information detailing what was involved in the repair (e.g., parts and/or labor), and/or any other information as desired. This information may be provided to the insurance company (e.g., to claim processing system 101) on a continuous or intermittent (e.g., periodic) basis. During step 306, the repair facility and/or the insurance company may also update their accounting systems 107 and/or 108 to reflect that a claim has been completed to repair.

As will be described further below, the insurance company may use the repair and/or accounting data to update the information stored in data storage 103 and/or to update the algorithms used to determine the payment amount in future claims.

In addition, as part of step 306 and/or at any other time, the quality of repairs that have been made (or that are in process) may be managed by various means such as spot inspections by the insurance company or a third party or through customer satisfaction surveys. Another possibility may be to require that the repair facility provide a warranty of each repair. The characteristics of the warranty program and process may be agreed to by the repair facility and insurance company and covered by the agreed payment amounts. The warranty program may be underwritten by a third party and adjudicated by the insurance company, or it may be adjudicated by the warranty company or another party agreed to by the insurance company, repair facility, and warranty company.

Figure 4:
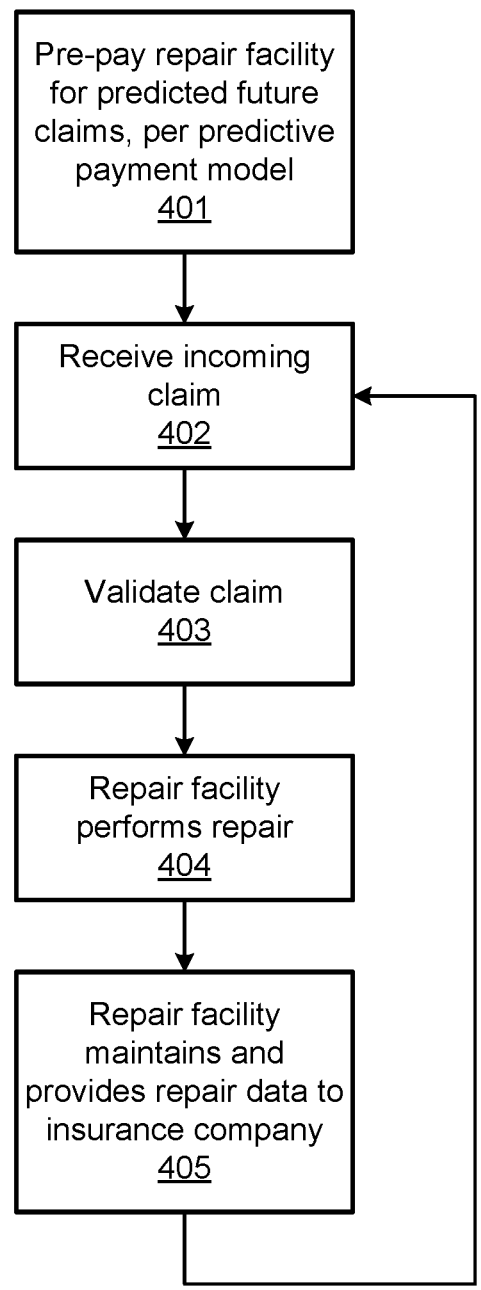
FIG. 4 is a flow chart of another example process that may be performed in accordance with one or more aspects as described herein.

FIG. 4 is a flow chart of another example process in accordance with one or more aspects as described herein. The various steps in the flow chart may be performed by one or more devices and/or humans, such as any of the elements of FIG. 1. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

At step 401, rather than paying a specific amount for a claim (or in bulk for a group of claims) after the incoming claims have been received, the process may involve partial or full pre-payment of predicted payment amounts for one or more future expected claims. The total payment amount in step 401 may be determined according to the predictive payment model in any of the ways discussed previously with regard to step 303, except in this case the payment amount may be determined based on predicted hypothetical future claims.

At step 402, the insurance company may receive an incoming new or revised claim. As previously described with regard to step 301, receipt of an incoming claim may occur by, for instance, receiving and/or generating data representing one or more characteristics of the claim. Again, the claim data may be generated by and/or provided to, for instance, claim processing system 101.

At step 403, the claim may be validated, such as by physical inspection of the property (e.g., vehicle) to confirm the claimed damage, the existence of the property, and/or other issues that may be associated with a claim. Validation has already been described in connection with step 302, and may also be performed in the same manner here. Moreover, step 403 may be performed prior to sending the property to the repair facility (and by a party other than the repair facility such as an insurance adjuster), or it may be performed by the repair facility itself during, for instance, step 404.

At step 404, the repair shop may perform the needed repair on the vehicle and/or other property covered by the claim. If the vehicle has not already been transported to the repair shop at an earlier step (such as during validation at step 403), then the vehicle may be transported to the repair shop. Once the repair is complete, the vehicle may be returned to the vehicle owner.

At step 405, the repair shop may maintain the previously-described repair data, such as via repair tracking system 104

(and which may be stored by data storage 105). As previously described, the repair data may include any information about the claim and/or about the repair made. This information may be provided to the insurance company (e.g., to claim processing system 101) on a continuous or intermittent (e.g., periodic) basis.

During step 405, the repair facility and/or the insurance company may also update their accounting systems 107 and/or 108 to reflect that a claim has been completed to repair. Where pre-payment has been made, such as in step 401, this may involve tracking how many claims have been completed versus how many have been pre-paid. If the pre-paid amount is deemed to be insufficient (e.g., if all predicted claims have been completed or are otherwise in process), then the insurance company may again perform step 401 to make an additional pre-payment for still further future claims.

As shown in FIG. 4, the claim process may repeated as desired, such as for the duration that the pre-payment amount from step 401 is sufficient to cover repair of the claims. Moreover, as will be described further below, the insurance company may use the repair and/or accounting data to update the information stored in data storage 103 and/or to update the algorithms used to determine the payment amount for future batches of predicted claims.

Figure 5:
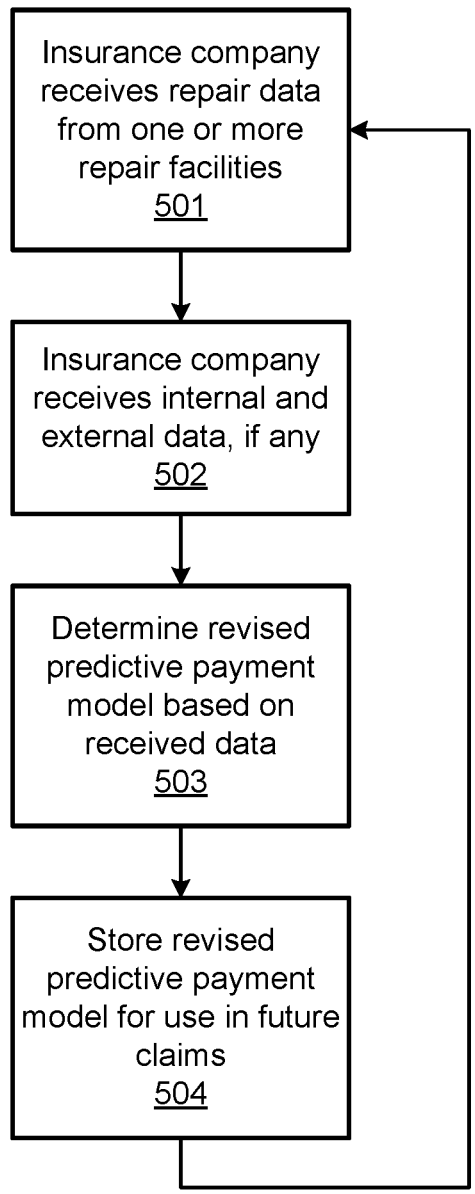
FIG. 5 is a flow chart of still another example process that may be performed in accordance with one or more aspects as described herein.

FIG. 5 is a flow chart of still another example process that may be performed in accordance with one or more aspects as described herein. The various steps in the flow chart may be performed by one or more devices and/or humans, such as any of the elements of FIG. 1. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

As previously explained, the insurance company may use the repair and/or accounting data to update the information stored in data storage 103 and/or to update the algorithms used to determine the payment amount for future submitted claims (in the case of payment after claim submission such as in FIG. 3) and/or for future expected hypothetical claims (in the case of pre-payment such as in FIG. 4). An example of how this may be accomplished is described in connection with FIG. 5.

At step 501, the insurance company may receive the repair and/or accounting data provided by the repair facility during, for instance, steps 306 and/or 405. The data may be received at any system of the insurance company, such as claim processing system 101, maintenance system 102, and/or accounting system 107.

At step 502, the insurance company may further receive or otherwise obtain any other data, which may be external data (e.g., from a third party separate from the insurance company) and/or internal data (e.g., data generated by or previously obtained by the insurance company). This additional data may include, for instance, information about claims by other insurance companies, news items, insurance statistics, profit margins, and/or vehicle sensor data (e.g., accelerometer, Global Positioning System, speed, etc.) that was collected during the incident leading to the claim. Any of such data may influence the predictive payment model and/or be used as inputs to the predictive payment model. Steps 501 and 502 may be performed at any time and in any particular order (even simultaneously and/or on a continuous or intermittent basis). These steps are shown in a particular order only as an example.

At step 503, the insurance company may determine whether and/or how to revise the predictive payment model stored in data storage 103. Such a determination may be performed by, for instance, maintenance system 102. The determination may be made based on one or more factors. For instance, it may be determined that the insurance company is less profitable than expected, or that the insurance company may even be losing money, based on the current predictive payment model. Additionally or alternatively, it may be determined (such as based on the external data) that the costs of parts for repairs are rising. In response to determinations such as these, maintenance system 102 may determine that the predictive payment model should be revised accordingly (so that, for instance, the average payments to repair facilities are higher). Of course, the opposite may be true—if the insurance company determines that the predictive payment model could be adjusted so that payments to the repair facilities are, on average, lower, then the predictive payment model could be revised accordingly as well.

At step 504, the predictive payment model as stored in data storage 103 may be revised in the determined manner, such as by maintenance system 102. As future claims and/or payments are made, the revised predictive payment model may be used going forward. The process of FIG. 5 may be repeated as desired on an ongoing basis. For instance, the process of FIG. 5 may be continuously performed and/or on an intermittent (e.g., periodic) basis, such as monthly, quarterly, or annually.

The various features described above are merely non-limiting examples, and can be rearranged, combined, sub-divided, omitted, and/or altered in any desired manner.

The invention claimed is:

1. A system comprising:
a processor;
a non-transitory computer-readable medium storing instructions that, when executed by the processor, cause the system to:
store first data comprising a model that associates a first one or more loss attributes with a plurality of multipliers and that associates a second one or more loss attributes with a plurality of costs;
receive, from a first computing device of a vehicle, second data, generated by the first computing device of the vehicle, wherein the second data is generated based on acceleration data generated by an accelerometer of the first computing device;
select, based on the second data, at least a first loss attribute from the first one or more loss attributes and at least a second loss attribute from the second one or more loss attributes;
determine a capitated cost of repair of the vehicle based on the first loss attribute and the second loss attribute; and
transmit, to a repair facility, a notification regarding payment based on the determined capitated cost of repair.

2. The system of claim 1, wherein determining the capitated cost of repair of the vehicle comprises determining the capitated cost of repair without inspecting actual damage to the vehicle.

3. The system of claim 1, wherein the instructions that, when executed by the processor, further cause the system to:

receive, via a communication network, third data from the repair facility indicating an actual cost of repair; and
revise the model based on the third data.

4. The system of claim 1, wherein the first one or more loss attributes or second one or more loss attributes comprises a place of occurrence of an incident involving the vehicle.

5. The system of claim 1, wherein the first one or more loss attributes or second one or more loss attributes comprises a date of occurrence of an incident involving the vehicle.

6. The system of claim 1, wherein the payment comprises the capitated cost of repair.

7. The system of claim 1, wherein the first computing device further comprises a global positioning sensor configured to sense a location of the vehicle and the first computing device is configured to generate the second data further based on the location of the vehicle.

8. The system of claim 1, wherein the first computing device further comprises a sensor configured to sense a speed of the vehicle and the first computing device is configured to generate the second data further based on the speed of the vehicle.

9. The system of claim 1 further comprising the first computing device.

10. A computing device comprising:
a processor;
a non-transitory computer-readable medium storing instructions that, when executed by the processor, cause the computing device to:
store first data comprising a model that associates a first one or more loss attributes with a plurality of multipliers and that associates a second one or more loss attributes with a plurality of costs;
receive, from a second computing device associated with a vehicle, second data that comprises vehicle sensor data, wherein the second computing device comprises a global positioning sensor configured to sense a location of the vehicle and the second computing device is configured to generate the vehicle sensor data based on the location of the vehicle;
select, based on the second data, at least a first loss attribute from the first one or more loss attributes and at least a second loss attribute from the second one or more loss attributes;
determine a capitated cost of repair of the vehicle based on the first loss attribute and the second loss attribute; and
transmit, to a repair facility, a notification regarding payment based on the determined capitated cost of repair.

11. The computing device of claim 10, wherein the instructions that, when executed by the processor, cause the computing device to:
initiate, at the repair facility, repair of the vehicle for the capitated cost of repair.

12. The computing device of claim 10, wherein the second computing device further comprises an accelerometer configured to sense an acceleration of the vehicle, and wherein the second computing device is further configured to generate the vehicle sensor data based on the acceleration of the vehicle.

13. The computing device of claim 10, wherein a determination of the capitated cost of repair of the vehicle comprises determining the capitated cost of repair without inspecting actual damage to the vehicle.

14. The computing device of claim 10, wherein the instructions that, when executed by the processor, cause the computing device to:
receive, via a communication network, third data from the repair facility indicating an actual cost of repair; and
revise the model based on the third data.

15. The computing device of claim 10, wherein the first one or more loss attributes or second one or more loss attributes comprises a place of occurrence of an incident involving the vehicle.

16. The computing device of claim 10, wherein the first one or more loss attributes or second one or more loss attributes comprises a date of occurrence of an incident involving the vehicle.

17. The computing device of claim 10, wherein the second computing device further comprises a sensor configured to sense a speed of the vehicle, and wherein the second computing device is configured to generate the vehicle sensor data further based on the speed of the vehicle.

18. A system comprising:
a computing device associated with a vehicle and an apparatus,
wherein the computing device comprises one or more processors, and memory storing machine readable instructions that, when executed by the one or more processors of the computing device cause the computing device to:
generate location data corresponding to the vehicle via a global positioning sensor;
generate speed data corresponding to the vehicle;
generate acceleration data corresponding to the vehicle; and
transmit vehicle data comprising the location data, the speed data, and the acceleration data to the apparatus;
wherein the apparatus comprises:
one or more processors, and memory storing machine readable instructions that, when executed by the one or more processors, cause the apparatus to:
store first data comprising a model that associates a first one or more loss attributes with a plurality of multipliers and that associates a second one or more loss attributes with a plurality of costs;
receive, the vehicle data from the computing device;
select, based on the vehicle data, at least a first loss attribute from the first one or more loss attributes and at least a second loss attribute from the second one or more loss attributes; and
determine a capitated cost of repair of the vehicle based on one or more of the plurality of multipliers associated with the first loss attribute, and further based on one or more of the plurality of costs associated with the second loss attribute.

19. The system of claim 18, wherein the first one or more loss attributes or second one or more loss attributes comprises a place of occurrence of an incident involving the vehicle.

20. The system of claim 18, wherein the first one or more loss attributes or second one or more loss attributes comprises a date of occurrence of an incident involving the vehicle.

* * * * *